UNITED STATES PATENT OFFICE.

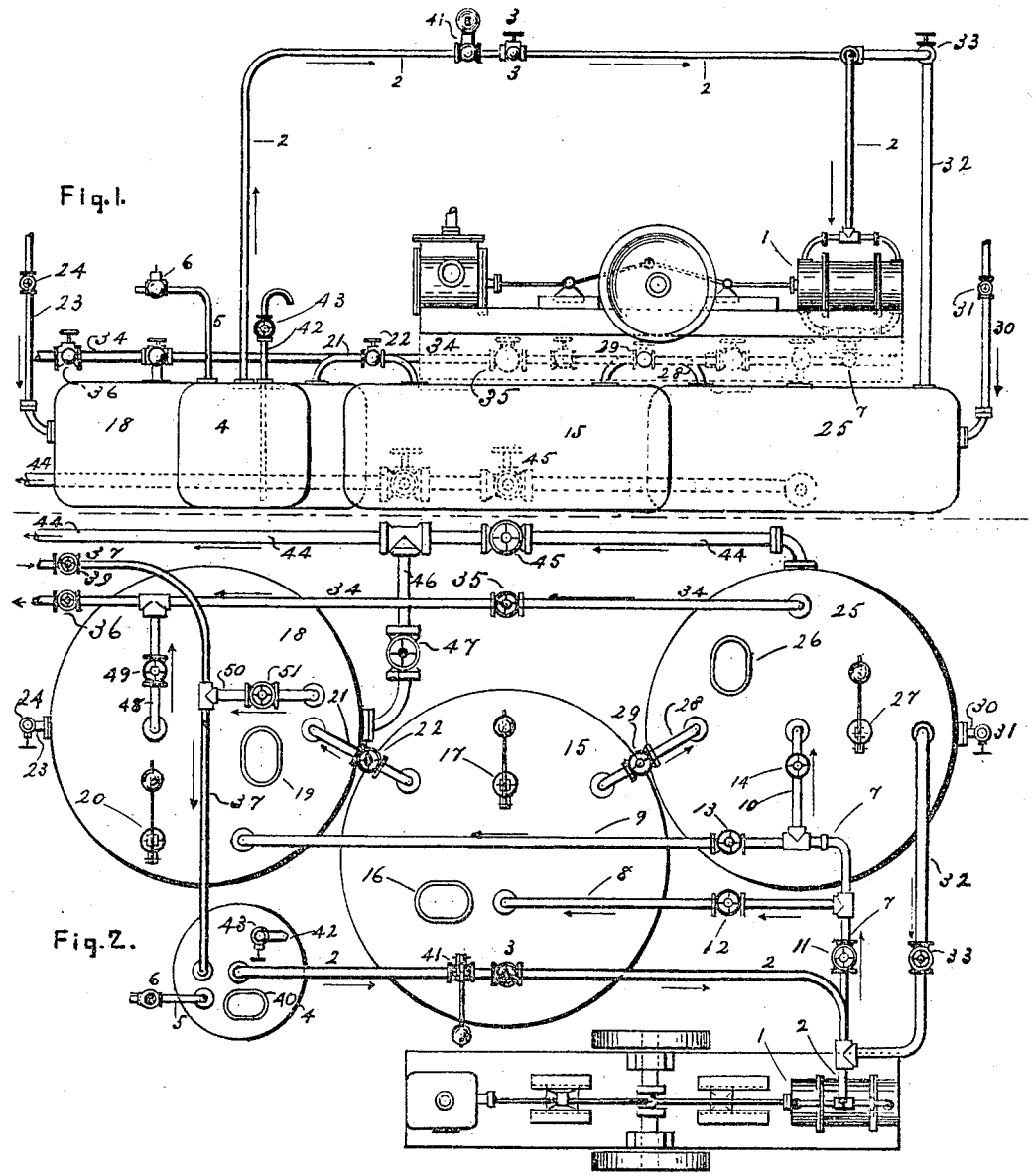

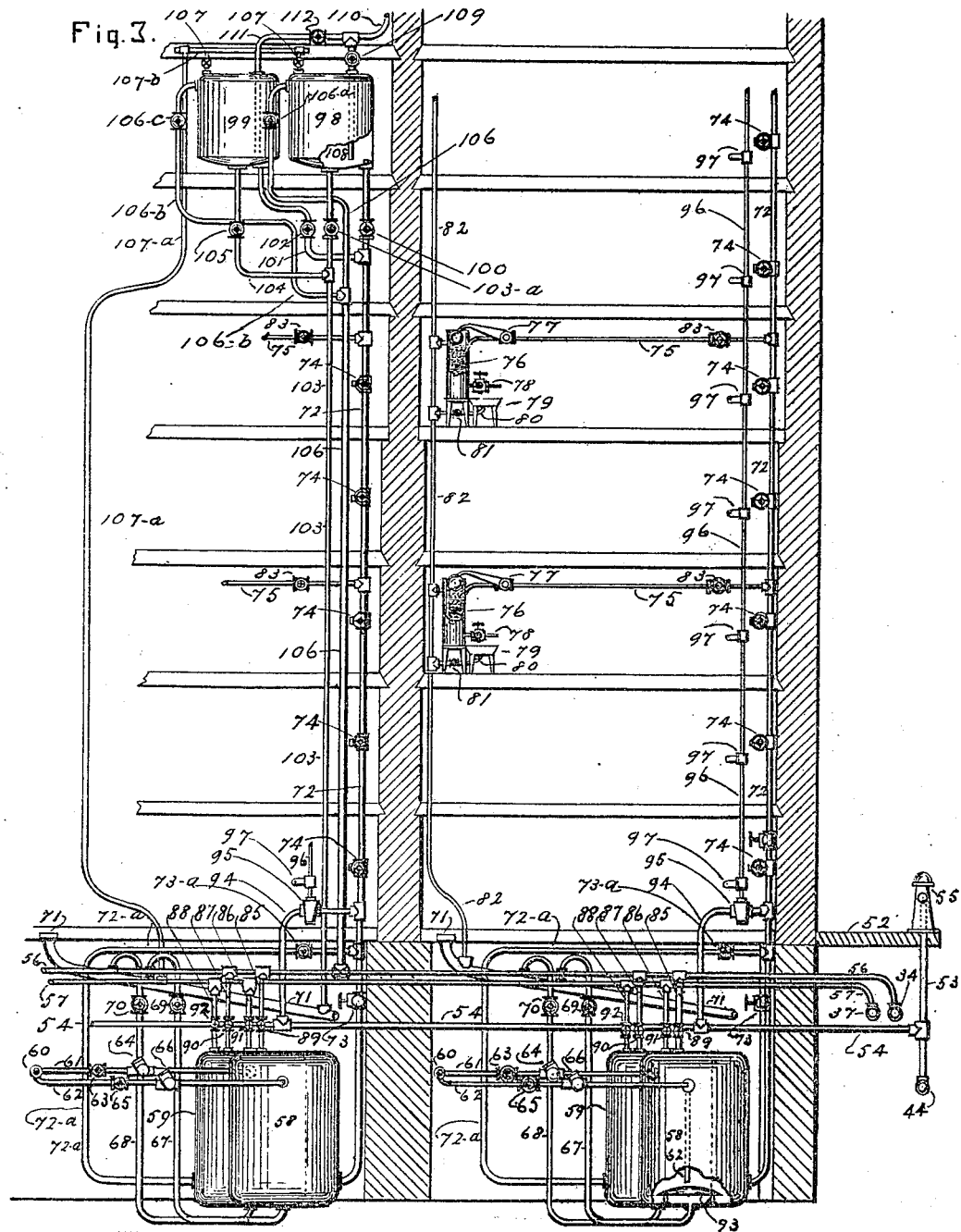

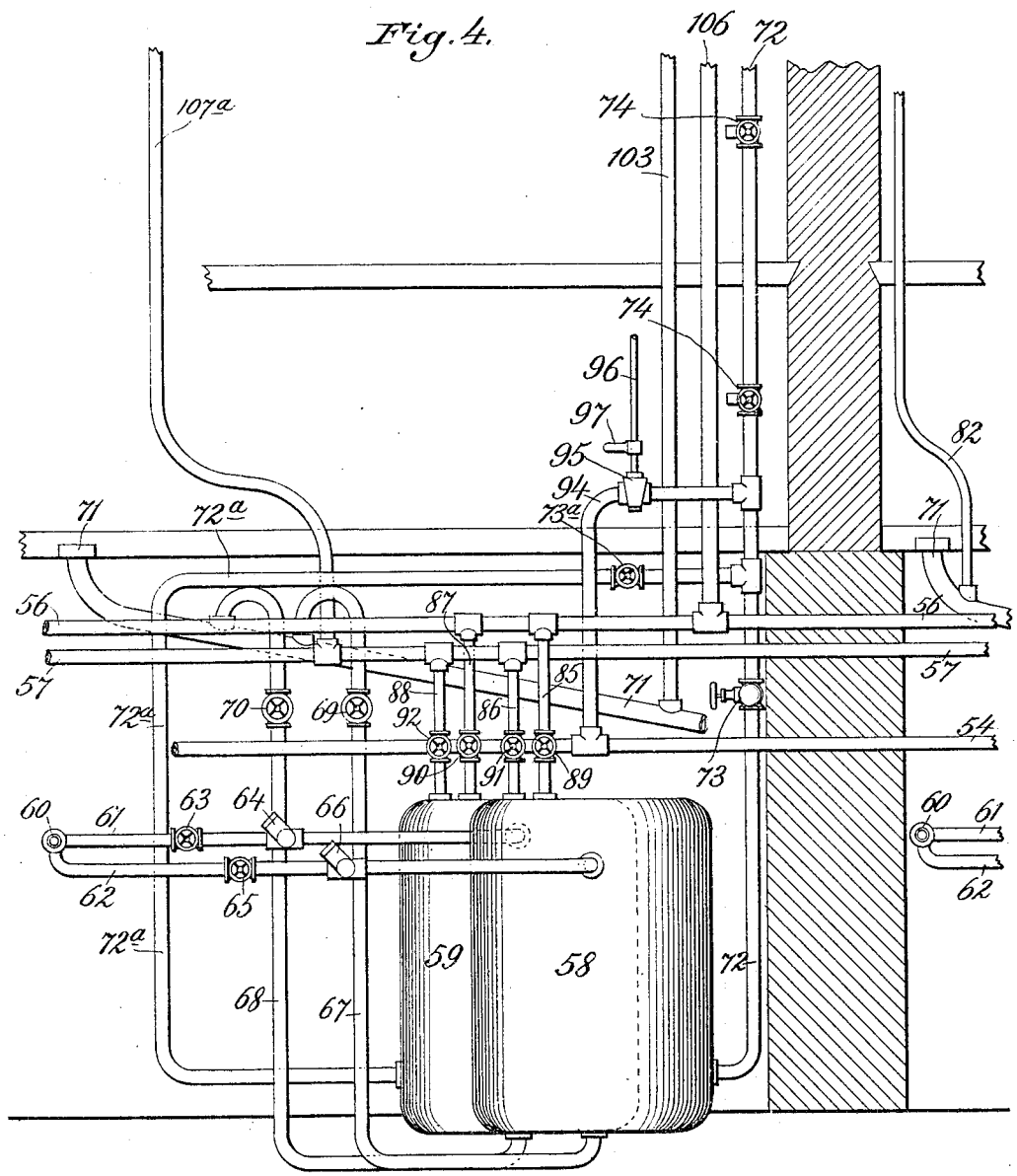

WALLACE P. GROOM, OF BROOKLYN, NEW YORK.

SYSTEM OF WATER-SUPPLY FOR URBAN AND OTHER BUILDINGS.

No. 808,083.      Specification of Letters Patent.      Patented Dec. 26, 1905.

Application filed March 21, 1905. Serial No. 251,227.

*To all whom it may concern:*

Be it known that I, WALLACE P. GROOM, a citizen of the United States, and a resident of 502 Fulton street, Brooklyn, in the county of Kings and State of New York, have invented certain new and useful Improvements in Systems of Water-Supply for Urban and other Buildings, of which the following is a specification.

My invention relates to systems of distributing water to the various floors of buildings under pressure for use with ordinary hose and nozzles or sprinklers, for extinguishing fires occurring on any of such floors, and for use in manufacturing processes and operations or for domestic purposes.

The invention has partly for its object the obviation of the pumps now much used in buildings for lifting or forcing water to elevations higher than the natural head from and under which the water flows from a reservoir, well, spring, street water-main, or other source and also the obviation of the need for unsightly storage-tanks on the roofs of buildings, often supported on frames resting upon the roofs in order to secure a sufficient head for effective throw of water when hose and nozzle or sprinklers are used for extinguishing fires.

The invention further has for its object the obtaining of ample pressure for fire-extinguishing purposes without excessive head or high pressure anywhere in the buildings wherein such system of apparatus is employed, unless in case of great emergency, as when a conflagration is threatened.

The invention has also for its object the equalization of the pressure at which the water is delivered for manufacturing or domestic use not only in the building or several buildings included in its operation, but on each, every, and all floors of such building or buildings of whatever height they may be.

The invention has further for its object a partial or entire relief from the necessity of portable fire-engines for extinguishing fires.

The invention consists partly of an air-compressor more or less remote from the aerohydrostatic apparatus in the building or buildings to be supplied or at a central air-compressor station, a compressed-air-main pipe leading from said air-compressor station to points in proximity to the building or buildings designed to be included in the operation of the system, compressed-air service pipe or pipes connected with the compressed-air main and with the apparatus inclosed in such building or buildings for the supply of compressed air thereunto, return service pipe or pipes connected also with such part of the apparatus as is inclosed in said building or buildings, and a return-main air-pipe connected with the return-service pipe or pipes for returning air expanded from a maximum to a minimum pressure back to and into the central air-compressor station.

The invention also consists partly in the combination with said air-compressor, compressed-air main, and return-air main, of a compressed-air and water reservoir placed in the building or buildings to be protected against fire and supplied with water for domestic or manufacturing purposes, said reservoir being used for storing a body of water under pressure for immediate use in extinguishing fire breaking out on any floor of said building and being also supplied with a proper system of piping for conveying water under pressure to the several floors of said building or buildings as required for the purposes enumerated.

The invention also partly consists in the general organization and combination of the mechanisms and constructions of the central air-compressor station combined with a compressed-air-main pipe and a return-air-main pipe and combined also with the mechanisms and constructions contained in the building or buildings embraced in the system of aerohydrostatic water-supply hereinafter described as parts of the system.

As any known special material, form, or construction of any of the various pipes, valves, tanks, or other separate parts of the apparatus used in carrying out my improved system of aerohydrostatic water-supply may, if adapted thereto, be used therein, the drawings are wholly diagrammatic.

Figure 1, lying above the dot-and-dash line in the drawings, is a side elevation of the central-station apparatus used in carrying out my invention; and Fig. 2, lying below the dot-and-dash line, is a plan view of the same. Fig. 3 is a front view of two adjacent buildings, each containing a part of my system of apparatus, the front wall of each building being removed the better to show the general character and arrangement of the apparatus. Fig. 4 is an enlarged view of reservoirs placed in the cellar or basement of the building, together with pipe connections thereof.

Referring to the drawings, I will first describe the central station. (Shown in Figs. 1 and 2.) In it is installed an air-compressor 1, which in carrying out the invention practically would be duplicated, so that while one may be stopped for adjustment or repair the other will be constantly in working order. This compressor is diagrammatically shown as being operated by steam-power; but it may be driven by electricity or any other motive power. The compressor inducts air through the pipe 2, fitted with a stop-valve 3, taking its air from a receiver 4, which in starting the apparatus at work, as hereinafter explained, takes air from the outside atmosphere through a pipe 5, fitted with a check-valve 6, that permits inflow of air to said receiver 4, but prevents any outflow therefrom back into the atmosphere. The compressor discharges the compressed air through pipe 7, fitted with a stop-valve 11. Pipe 7 has three branches—namely, pipe 8, fitted with a stop-valve 12, pipe 9, fitted with a stop-valve 13, and pipe 10, fitted with a stop-valve 14. Pipe 8 connects pipe 7 with an air-storage reservoir 15, which in use is normally filled with compressed air at the highest pressure used in the system. The reservoir 15 is made of iron or steel of sufficient strength to withstand the internal pressure with a liberal factor of safety and is preferably sunk in the earth after being exteriorly protected from oxidation and corrosion by galvanizing or by application of any good protecting substance to its outer surface. It is provided with a manhole 16, Fig. 2, for access to its interior and a safety-valve 17, Fig. 2, the latter being set to prevent accumulation of pressure above the highest pressure required for the normal working of the system, as hereinafter explained. The branch pipe 9 connects pipe 7 with reservoir 18, used for storage of water under the pressure of superincumbent air conveyed thereto through said pipe. Reservoir 18 is also provided with a manhole 19, Fig. 2, for access to its interior, and safety-valve 20 for limiting the pressure therein. A bypass pipe or air-loop pipe 21, provided with a stop-valve 22, connects the interiors of reservoirs 15 and 18 when the valve 22 is opened. Water from any available source is supplied to reservoir 18 through pipe 23, which is fitted with a stop-valve 24. The branch pipe 10, fitted with stop-valve 14, connects the compressed-air-discharge pipe 7 with a reservoir 25, also used for storage of water under pressure of superincumbent air, as described for reservoir 18. Reservoir 25 is provided with a manhole 26, for access to its interior, and a safety-valve 27 for limiting the pressure therein. A by-pass pipe or air-loop pipe 28, provided with a stop-valve 29, connects the interiors of the reservoirs 15 and 25 whenever the valve 29 is opened. Water is supplied to the reservoir 25 from any available source through the pipe 30, fitted with a stop-valve 31. Both the reservoirs 18 and 25 are preferably formed protected from corrosion or oxidation and sunk in the earth, as described for reservoir 15; but they may be placed above the ground and in any position which the conditions of installation render most desirable in any particular case. A pipe 32, fitted with a stop-valve 33, connects the reservoir 25 with the induction-pipe 2, whereby when proper adjustments, hereinafter described, are made the reservoir 25 can be exhausted of air without waste of compressed air while said reservoir is being supplied with water. A compressed-air-main pipe 34, provided with stop-valves 35 and 36, is connected with the reservoir 25 and leads out from the central station to a point as near to the buildings included in the system as is practicable. It is shown as broken off at the left sides of Figs. 1 and 2, its continuation being shown in Fig. 3. Pipe 34 conducts compressed air out to the buildings to be supplied when the system is in operation. A return-air-main pipe 37 extends from points near the buildings to be supplied to the receiver 4 at the central station and is fitted with a stop-valve 39, as shown in Fig. 2. Pipe 37 conducts air, usually at a pressure materially above normal atmospheric pressure, back from said buildings to receiver 4 without waste; but the pressure in the return-air main may at times not exceed that of the atmosphere or possibly be slightly less in exceptional cases. Receiver 4 is provided with a manhole 40 and a safety-valve 41 set to allow air to escape at a predetermined pressure, generally not exceeding twenty pounds per square inch. The safety-valve 41 is shown placed in pipe 2 near the stop-valve 3. A pipe 42, provided with a stop-valve 43, extends from a point near the bottom of receiver 4 upward through the top, which pipe under the pressure of air in said receiver permits any water which may collect therein through condensation or other cause to be forced up and out through the upper end of said pipe. The object of the safety-valve 41 is to prevent air discharged from the hereinafter-described aerohydrostatic apparatus placed in the building or buildings and into the return-air main from accumulating an undue pressure in the return-main at any time during the action or stoppage of the compressor. Connected with the lower part of reservoir 25 is a water-main pipe 44, provided with a stop-valve 45, which pipe extends out from said reservoir to points as near as practicable to the buildings comprised in the system. This pipe is shown as broken off at the left of Figs. 1 and 2, its continuation being shown in Fig. 3. A branch pipe 46, provided with a stop-valve 47, connects the reservoir 18 with the water-pipe 44. A branch pipe 48, fitted with a stop-valve 49, connects the compressed-air and water storage reservoir 18 with the compressed-air-main pipe 34, as shown in Fig. 2, and another branch pipe 50 (shown in Fig. 2 and fitted with a stop-valve 51) connects the same reservoir with the return-air-main pipe 37. By properly opening and closing the various valves so far described either or both of the compressed-air and water storage reservoirs 18 and 25 may be temporarily shut off from other parts of the system without stopping the other parts. Similarly the compressed-air-storage reservoir 15 may be shut off from other parts of the system without stopping the other parts. The air-compressor may also be temporarily shut off without stopping the action of other parts after the several reservoirs are charged with air and water, as hereinafter described. To charge the compressed-air and water storage reservoir 25 with water and air, assuming the compressor 1 to be running, valves 3, 13, 14, 29, 35, and 45 are closed and valves 11, 12, 31, and 33 are opened. Air will then be drawn from reservoir 25 by the compressor and passed into reservoir 15, while water will flow into reservoir 25 through pipe 30. The reservoir 25 when charged with water will be about three-fourths filled. When so filled, as will be indicated by suitable indicators, (not shown in the drawings, being unnecessary for explaining the invention,) valves 12, 31, and 33 are closed and valves 3 and 14 are opened. Air will then pass into the compressor through pipe 2 and be passed into reservoir 25 through pipe 7 and the branch pipe 10. The safety-valve 27 being set to open at one hundred pounds pressure per square inch will remain closed until air has accumulated under this pressure over and upon the surface of the water in said reservoir. When the safety-valve 27 lifts, valve 14 is closed, and the reservoir 25 is thus fully charged with air and water at one hundred pounds pressure per square inch. To charge reservoir 18 with water and compressed air, valves 35, 36, 39, and 43 are closed and valves 51, 24, 3, 11, and 12 are opened. The reservoir 18 is then exhausted of air through pipes 50 and 37, receiver 4, and pipe 2, and water flows in through pipe 23, while the air exhausted from reservoir 18 is again compressed and discharged into the air-storage reservoir 15. This reservoir, like reservoir 25, is thus supplied with water till about three-fourths full, when valve 24 is closed. Valves 12 and 51 are now closed and valves 6 and 13 are opened. Air is now inducted from the outside atmosphere through the inlet-pipe 5 and pipe 2 and forced through pipes 7 and 9 into reservoir 18 till the discharge from the safety-valve 20 indicates that the limit of pressure is reached. Valve 13 being now closed, reservoir 18 is thus fully charged with water and air under the desired pressure. The compressed-air reservoir 15 will be at this time partially charged and may be further charged to full pressure by first seeing that valves 22 and 29 in the by-pass pipes 21 and 28 are tightly closed and then opening valve 12 in pipe 8. After the reservoirs are charged as described the water-main pipe 44 can be filled under pressure from reservoir 25 by opening valve 45 or from reservoir 18 by opening valve 47 or from both these reservoirs simultaneously by opening both of said valves simultaneously. When the system is in normal operation, the water-main pipe remains filled with water under the pressure due to the height of the water in one or both said reservoirs plus the pressure of the superincumbent air therein. It must be understood that the operation of the air-compressor will always maintain the full pressure in all the tanks when said compressor delivers air into the air-reservoir 15 and the by-pass valves 22 and 29 are opened, and by opening the valves 35 and 36 air under the pressure maintained in all three reservoirs 15, 18, and 25 will pass into and fill the compressed-air main 34, and though in my diagrammatic drawing I show a special arrangement of pipes, valves, and other details I do not confine myself to the particular arrangement and organization shown, reserving the right to use any position or arrangement of the parts which will permit the simultaneous use of more than one air and water storage reservoir, yet permit their separate and independent use either in connection with the air-reservoir 15 or while the latter is shut off from other parts of the system. Neither do I limit myself to the particular valves shown in the drawings; but I may use in any of the pipes hereinbefore or hereinafter described either stop-valves or check-valves wherever in the installation of any particular plant they may be found desirable or useful. The valve 39 in the return air-main pipe 37 is now to be opened, and when discharge of air from apparatus shown in Fig. 3 and yet to be described raises the pressure in said return air-pipe above ordinary atmospheric pressure the induction of air to receiver 4, Fig. 2, through the inlet-pipe 5 will cease.

Referring now to Fig. 3, the latter is a partial sectional elevation looking from the front of a part of a group of buildings comprised in the system, the right-hand building being shown as standing on the corner of a city block, with a sectional view of a sidewalk 52 projecting therefrom. The main water-pipe 44 is shown end on and extended to a line coinciding with the front line of the buildings shown. Similarly, the compressed-air main 34 and the return-air main 37 are shown end on and extended to the same line. Near this line rises a pipe 53, connected with pipe 44 and with a hydrant 55. A branch water service-pipe 54 is connected with pipe 53 and extends through the cellars or basements of the buildings. This pipe 54 is for use only in cases of emergency, as when an immediate conflagration has to be met or the regular water-supply in the buildings chances to be inadequate, as hereinafter explained. From the compressed-air-main pipe 34 and connected therewith extends a branch compressed-air service-pipe 56, and connected with the return-air main 37 is a branch return-air service-pipe 57. Thus water and compressed air are brought into the buildings, and air more or less expanded from the pressure maintained in pipes 34 and 56 is returned through pipe 57 to the return-air main 37, in which it is conveyed back to the receiver 4, Fig. 2, in the central station. In the cellar or basement, or preferably sunk in the earth at the bottom of such cellar or basement, are placed two air and water reservoirs 58 and 59. These reservoirs are supplied with water, not from the water-main pipe 44, but from the regular city water-main through an ordinary water service-pipe 60 and the branch pipes 61 and 62. Pipe 61 is connected with reservoir 59 and is provided with a stop-valve 63 and a check-valve 64. Pipe 62 is connected with reservoir 58 and is provided with a stop-valve 65 and a check-valve 66. The stop-valves are used when for any purpose it is desired to stop off either one of the reservoirs 58 or 59 from other parts of the system. Normally these valves are left open, and the check-valves prevent return-flow to pipe 60 when the compressed air is admitted to the reservoirs, as already set forth. Two outlets for discharge of water are provided for each of the reservoirs 58 and 59. The pipe 67, provided with a stop-valve 69, is connected with the middle of the bottom of reservoir 58 and, passing outward, rises to a point above the house drainage-pipe 71, then turns downward and connects with said drainage-pipe. Pipe 68, provided with a stop-valve 70, is connected with the middle of the bottom of the reservoir 59 and is connected with the drainage-pipe in exactly the same manner. The two pipes 67 and 68 are blow-off pipes only used for flushing the reservoirs and freeing them from any sediment or other impurity which may flow into them from the city main 60. From a point near the bottom and in the side of each tank 58 and connected therewith rises a water-pipe 72, provided with a stop-valve 73 and with valve-controlled outlets 74 for attachment of hose, sprinklers, or other fire-extinguishing devices, which may be placed on any of the floors of the building or buildings to be protected. Connected with pipe 72 are one or more branch pipes 75, each of which extends to and supplies a water-tank 76 with water for manufacturing or domestic purposes. The flow into each of these tanks is controlled by a ball-cock 77, which whenever the water in said tanks falls below a stated level opens and permits flow of water to restore the level in the tank. In this way water for domestic or manufacturing purposes is supplied to any of the floors at a substantially uniform pressure, which pressure is very much less than is maintained in the water-pipe 72, as more fully hereinafter set forth. The valve-controlled outlet from tank 76 is shown at 78 and arranged to deliver water into an ordinary sink 79. Each sink 79 has a drain-pipe 80, controlled by a valve 81. This drain-pipe delivers water into the house drain-pipe 82, which is connected with and extends from the main drain-pipe 71 up through all the floors or as many of them as necessary. A stop-valve 83 in each pipe 75 serves to shut off water altogether from any tank when so desired. A pipe 85, supplied with a stop-valve 89, connects the top of the reservoir 58 with the compressed-air service-pipe 56, connected with the compressed-air-main pipe 34, which latter, as previously explained, extends out from the central station. (Shown in Figs. 1 and 2.) Similarly, a pipe 87, provided with a stop-valve 90, connects the top of reservoir 59 with the compressed-air service-pipe 56. A pipe 86, provided with a stop-valve 91, also connects the top of reservoir 58 with the return-air service-pipe 57, which, as previously explained, connects with the return-air-main pipe 37, leading back to the reservoir 4, Figs. 1 and 2. In like manner a pipe 88, provided with a stop-valve 92, connects the top of reservoir 59 with the return-air service-pipe 57. Also at a point near the bottom of the reservoir 59 is connected a water-pipe $72^a$, provided with a stop-valve $73^a$, the pipe $72^a$ being also connected with the pipe 72. The compressed-air-main pipe 34 might be extended back to and directly connected with the outlet of the compressor; but as shown this pipe and the intermediate reservoirs and connections between it and the compressor-outlet, together with the branch compressed-air service-pipe 56 and pipes 85 and 87, Fig. 3, form when the system is in operation a continuous passage for compressed air from the compressor-outlet to and into the compressed-air and water reservoirs 58 and 59. Into each of the reservoirs 58 and 59 the water-supply pipe 61 or 62 extends downward near to the bottom, as shown in Fig. 3 in one of the reservoirs 58, of which a portion is represented as broken away to show a feature of the interior construction. This feature is intended to prevent the roiling of the contained water when the reservoirs are being filled. A shield 93, made fast to supports at the bottom, is held concentrically with the shell of each reservoir, the center of the shield being immediately below the open end of the water-supply pipe, as shown. The water in its flow from the open end of the pipe is received on the upper convex surface of this shield and spread into a thin sheet, flowing with a comparatively low velocity radially outward instead of dashing violently against the bottom and thereby stirring up any sediment which may have accumulated in the interval subsequent to the last blowing off.

The operation of the apparatus shown in Fig. 3, so far as it has now been described, premising that the reservoirs 15, 18, and 25 in the central station have been charged with water and compressed air, as hereinbefore described, and that the air-compressor is in operation and that the valves 35, 36, 39, and 45 (shown in Fig. 1) have been opened, is as follows: The water-main pipe 44 and water-service pipe 54 are filled with water under a pressure of, say, one hundred pounds per square inch. The compressed-air-main pipe 34 and compressed-air service-pipe 56 are also filled with compressed air at substantially the same pressure. The valves 89 and 90 in pipes 85 and 87 being closed and valves 91 and 92 in pipes 86 and 88 being opened, free passage of air from the reservoirs 58 and 59 into the return-air service-pipe may take place. Also valves 63 and 65 in the water-supply pipes 61 and 62 being opened, water from the water-service pipes 60 will flow freely into the reservoirs 58 and 59 and will be retained there when the valves 69 and 70 in the blow-off pipes 67 and 68 are closed. When the reservoirs 58 and 59 are filled with water, valves 63 and 65 are closed. The valves 91 and 92 are now closed, and the valves 89 and 90 are opened. This permits free flow of the compressed air from the compressed-air service-pipe 56 into the reservoirs 58 and 59 till full pressure is therein attained. Valves 73 and 73$^a$ being now opened, water is forced from the reservoirs up into the riser water-pipes 72. The valves 83 in the pipes 75 being now opened, water will flow into the tanks 76 till the ball-cocks 77 close automatically. The apparatus is now ready for use in extinguishing fire upon floors of the buildings and for domestic or manufacturing purposes. In case of an emergency wherein the local supply of water is not sufficient for the speedy control of a fire occurring in any of the buildings a copious supplementary supply is obtainable from the water-main 44 through pipe 54. For this purpose a pipe 94, provided with a plug-cock 95, connects the riser water-pipe in each building with the water-service pipe 54. When the plug-cock 95 is opened, water under the full pressure maintained in the water-main pipe 44 flows through pipe 44, pipe 54, and pipes 94 directly into the lower part of the riser water-pipe 72. The plug-cock 95 is operated from any floor of the building by a rod 96, permanently attached to the plug, extending up through the several floors, and on each floor provided with a permanently-attached wrench 97, as shown in Fig. 3. By use of the hydrant 55, supplied by pipe 53 from the water-main pipe 44, water may be applied to the outside of the building or buildings through a hose simultaneously with its application on the inside. It will also be seen that water for quenching fires may be taken separately or simultaneously from interior air and water reservoirs hereinafter described. It will be seen from this explanation that either of the reservoirs 58 and 59 may be used while the other is filling, and that both may be used together, and also that the air-pressure in reservoir 15 may be temporarily raised to a higher pressure, if desired.

It remains to describe that portion of the apparatus whereby water may be elevated to any desired height without increase of pressure above that maintained in the apparatus already described. This feature of the apparatus is shown at the upper part and at the left side in Fig. 3 and is shown only in one of the buildings, though in actual use in tall buildings it would be used in all of them. It consists in two relay water and air storage reservoirs 98 and 99, connected with the compressed-air service-pipe 56 and with the house drainage-pipe 71 for blowing off sediment, substantially as follows: Reservoir 98 is supplied with water from the riser water-pipe 72, provided near said reservoir with a stop-valve 100 this pipe entering the reservoir through the bottom and extending upward a little way above the bottom, where a portion of the side of the reservoir is shown broken away. A water-supply branch pipe 101, provided with a stop-valve 102, is connected with pipe 72 at a point somewhat lower than the stop-valve 100 and also with the bottom of the reservoir 99. From the middle of the bottom of reservoir 98 and connected therewith extends downward a drain-pipe 103, supplied with a stop-valve 103$^a$, which pipe connects at the bottom with the house drainage-pipe 71. When water under pressure is in the reservoir 98, this reservoir may be flushed or blown off by opening valve 103$^a$. A branch blow-off pipe 104, provided with a stop-valve 105, is connected with pipe 103 at a point somewhat below valve 103$^a$ and also with the middle of the bottom of the reservoir 99. By opening valve 105 reservoir 99 may be flushed as described for reservoir 98, or both reservoirs 98 and 99 may be blown off together. Connected with and rising from the compressed-air-main pipe 56 is a compressed-air-supply pipe 106, provided near its upper end with a stop-valve 106$^a$ and also connected with the upper part of the reservoir 98. When the valve 106$^a$ is opened, compressed air is forced into the reservoir over the water contained therein. Connected with the pipe 106 and also with the upper part of the reservoir 99 is a branch compressed-air-supply pipe 106$^b$, provided near the upper end with a stop-valve 106$^c$. When valve 106$^c$ is opened, compressed air is forced into reservoir 99 over the water contained therein. At the top of each reservoir 98 and 99 is fitted a petcock 107, which when opened allows air to escape from the reservoir to which it is fitted. These petcocks may discharge directly into the surrounding atmosphere; but they are preferably fitted to discharge into a pipe 107$^b$, which is connected with a pipe 107$^a$, leading down to and connected with the return-air service-pipe 57. From an interior point near the bottom of reservoir 98 rises a water-pipe 108, passing air and water tight through the top of the reservoir, provided with a stop-valve 109 and connected at the top with a riser water-supply pipe 110, shown as broken off in the drawings, but in use extending to floors above and there provided with outlets for attachment of hose or other fire-extinguishing devices, and also provided with pipes similar to pipes 75 shown and described for supplying water for domestic or manufacturing purposes. Similarly, from a point near the bottom of the interior of reservoir 99 rises a water-pipe 111, which provided with a stop-valve 112 and passing through an air and water tight joint in the top of said reservoir, is connected also with the pipe 110. To charge reservoirs 98 and 99 with water after the reservoirs 58 and 59 in the cellar or basement have been charged as hereinbefore described, valves 109 and 112 are closed and the petcocks 107 are opened to vent the reservoirs. Either or both valves 73 and 73$^a$ in the basement having previously been opened, the valves 100 and 102 are then opened. The pressure of the superincumbent compressed air in the lower air and water reservoir or reservoirs will then force water up through pipe 72 into reservoir 98 and also through the branch water-supply pipe 101 into reservoir 99. When these relay air and water reservoirs are thus filled, the petcocks 107 and valves 100 and 102 are closed. Valves 106 and 106$^c$ being now opened, air at the full pressure of that in the compressed-air main, minus the weight of the air-column in pipe 106, (which is a very small fraction of a pound per square inch,) will force water up into pipe 110 for use on floors above reservoirs 98 and 99. It will be seen that either reservoir 98 or 99 may be used separately or that both may be used together, and as the same is true of the reservoirs 58 and 59 in the basement, as well as of the large air and water storage reservoirs 18 and 25 in the central station, Fig. 1, means are thus provided whereby the charging of any reservoir in the system may at all times be effected without stopping or interfering with the operation of any other part of the apparatus, thus securing that the system shall at all times be operative for extinguishing fires and that it may be supplied with water even while in use for extinguishing fires. It will be seen that water will be delivered from the fire-extinguishing outlets and to the tanks for domestic or manufacturing supply under precisely the same conditions of pressure as from pipe 72. Suppose the highest outlet in pipe 72 to be ninety-eight feet above the tops of reservoirs 58 and 59. To raise water to that elevation will require a pressure of about forty-nine pounds per square inch. Therefore if a pressure of one hundred pounds per square inch be maintained in reservoirs 58 and 59 water will be delivered from said highest outlet at a pressure of fifty-one pounds per square inch or a pressure sufficient, allowing for friction, to obtain a throw of water from said outlet to a height of, say, seventy-five feet. The same pressure will be substantially maintained in the relay reservoirs 98 and 99 as in reservoirs 58 and 59; but these pressures may be varied to suit circumstances. A pressure of sixty pounds per square inch in reservoirs 58 and 59 and in the relay air and water reservoirs 98 and 99 would force the water to the height of ninety-eight feet above these reservoirs and still deliver at a pressure sufficient to produce a throw of stream of about fifteen feet, which would be sufficient for local fire-extinguishing on any particular floor when a hose of proper length is used.

I have described my invention with reference to a central station and a group of buildings more or less remote from such station; but I wish to state that a similar organization of apparatus would be applied to use for a large hospital, asylum, or other large detached building and that therefore the number of buildings, be the same one or more than one, is not a limitation of my claims as hereinafter set forth.

Discharge of air from reservoirs 58 and 59 into the return-pipe 57 will increase the pressure in said pipe and in the return air-main 37, in which latter the pressure may reach at times a maximum of twenty pounds per square inch, and as it needs less power to compress air from twenty-pounds pressure to any other higher pressure than would be required for compression from atmospheric pressure to the same higher pressure economy of power is secured by the use of the return air-main.

I am aware that systems of apparatus for the supply of compressed air from central air-compressor stations are in use for operating elevators and driving machinery, and I do not claim, broadly, a central air-compressing station. I am also aware that forcing liquids from tanks in lower parts of buildings up to and into tanks in higher parts by use of compressed air has been used in sugar-refineries, oil-refineries, &c. I therefore do not broadly claim compressed-air apparatus for elevating water.

What I consider as my invention, and desire to protect by Letters Patent, is as follows:

1. An aerohydrostatic system of water-supply for a building or buildings, comprising the combination of an air-compressor stationed and installed at a distance more or less remote from said building or buildings, an air and water reservoir in said building or buildings for receiving and storing compressed air and water, a water-pipe 72 connected with said reservoir and provided with outlets 74, a compressed-air passage connecting the air-compressor with the compressed-air and water reservoir in said building or buildings for supply of compressed air to such reservoir, and a water-pipe connected with a water-main and the reservoir for supplying said compressed-air and water reservoir with water, substantially as and for purposes set forth.

2. As part of a system of aerohydrostatic water-supply for a building or group of buildings, the combination of an air-compressor, a storage compressed-air and water reservoir connected with the outlet of said compressor by a valve-controlled pipe or passage, a valve-controlled compressed-air-main pipe connected with said reservoir and also with the aerohydrostatic apparatus in said building or buildings, a valve-controlled return-air-main pipe, a passage for air from said aerohydrostatic apparatus to and into said return-air-main pipe, and a receiver 4 connected with such return-main pipe and having a valve-controlled pipe connected with the induction-pipe of said compressor, substantially as and for the purpose set forth.

3. In a system of apparatus for aerohydrostatic water-supply for a building or group of buildings, the combination of an air-compressor, a central-station compressed-air reservoir connected with said air-compressor by a valve-controlled pipe or passage, a valve-controlled compressed-air main connected with said air-reservoir, an aerohydrostatic reservoir in said building or buildings and connected with the compressed-air-main pipe by a valve-controlled compressed-air service-pipe, a valve-controlled water service-pipe connected with the aerohydrostatic reservoir, and with a water-main or other source of water-supply, a fire-extinguishing service-pipe connected with said aerohydrostatic reservoir and extending up through floors of said building or buildings, and provided with valve-controlled outlets for attachment of hose or other fire-extinguishing appliances, and a return-air-main pipe connected by a valve-controlled pipe with said aerohydrostatic reservoir and with said compressor by a valve-controlled return-air pipe substantially as and for purposes described.

4. In an aerohydrostatic system of water-supply for a building or buildings, the combination with an air and water storage reservoir placed in the cellar or basement of any of such building or buildings, and supplied with water and compressed air through a water-supply pipe and a compressed-air-main pipe, substantially as herein set forth, of a relay compressed-air and water storage reservoir placed at a higher level in said building and provided with valve-controlled air-vents, a valve-controlled water-pipe connecting the water-spaces in said reservoirs, a compressed-air pipe connected with the upper part of the relay-reservoir and with the compressed-air-main pipe, and a water-pipe connected with the lower part of said relay-reservoir and extending to floors above said relay-reservoir, all substantially as and for purposes set forth.

5. The combination of a central-station air-compressor, a central-station compressed-air and water storage reservoir, air-passage connecting said reservoir with said compressor, means for supplying water to said reservoir, a valve-controlled water-main pipe connected with said reservoir and extending out from the central station to a point near a building or buildings to be protected from fire, a hydrant placed near such building or buildings, pipe 53 connecting said water-main with said hydrant, riser-pipe 72 in the interior of said building or buildings and provided with outlets 74, pipe 54 connected with said water-main, and valve-controlled pipe 94 connecting pipes 54 and 72, substantially as described and for purposes set forth.

6. The combination with a central-station air-compressing plant, comprising an air-compressor and duplicate air and water storage reservoirs connected with the outlet of said compressor, means for supplying said reservoirs with water, means for separate or simultaneous operation, of a valve-controlled water-main pipe connected with each of said reservoirs, aerohydrostatic water-elevating apparatus in a building or buildings at a distance more or less remote from the central station, a hydrant 55, pipe connecting said water-main pipe with said hydrant, and means for operating the duplicate reservoirs in the central station, said hydrant, and said aerohydrostatic water-elevating apparatus simultaneously, substantially as and for purposes described.

7. The combination of a central-station air-compressor, a central-station compressed-air and water reservoir 18 connected by valve-controlled pipe connections to the outlet of said compressor, a separate central-station compressed-air and water reservoir 25 connected by valve-controlled pipe connections to said outlet, a valve-controlled water-main pipe 44 connected with reservoir 25 and also by separate valve-controlled pipe connection with reservoir 18, valve-controlled water-pipes 23 and 30 respectively connected with said reservoirs, an aerohydrostatic water-elevating apparatus placed in a building or buildings more or less remote from the central station, a valve-controlled compressed-air-main pipe and a return-air-main pipe, both of said main pipes connecting said central station and said aerohydrostatic apparatus, substantially as and for purposes described.

8. The combination of a central-station air-compressor, duplicate central-station compressed-air and water reservoirs, each connected by valve-controlled compressed-air-pipe connection with the discharge-outlet of said compressor, water-main pipe connected with each of said reservoirs by valve-controlled pipe connection, a return-air receiver 4 connected by valve-controlled pipe connection with the inlet of said compressor, an aerohydrostatic water-elevating apparatus situated in a building or buildings more or less remote from said compressor and connected with said water-main, valve-controlled compressed-air-main pipe connected by valve-controlled pipe connections with said reservoirs and also with said aerohydrostatic apparatus, and a valve-controlled return-air-main pipe connected with said aerohydrostatic apparatus and with said receiver, substantially as and for purposes set forth.

9. The combination of a central-station air-compressor, a compressed-air reservoir 15 connected by valve-controlled pipe connection with the outlet of said compressor, a valve-controlled compressed-air-main pipe 34, means for connecting said compressed-air reservoir with and disconnecting it from said compressed-air-main pipe, an aerohydrostatic water-elevating apparatus situated in a building or buildings more or less remote from said central station and connected with said compressed-air-main pipe, a central-station return-air receiver 4, valve-controlled pipe connection connecting said receiver with the outlet of the air-compressor, and a valve-controlled return-air-main pipe connected with both said aerohydrostatic apparatus and said receiver, substantially as and for purposes specified.

10. The combination of a central air-compressing station containing an air-compressor, and separate air-storage reservoirs, an aerohydrostatic water-elevating apparatus situated in a building or buildings more or less remote from said central station, means for passing compressed air separately or simultaneously from said reservoirs to said aerohydrostatic water-elevating apparatus, means for returning air discharged from said aerohydrostatic apparatus back to said central-station compressor and means for charging said reservoirs separately or simultaneously with compressed air from said compressor, substantially as and for purposes set forth.

11. The combination of a central air-compressing, air and water storage station, containing an air-compressor and separate reservoirs for storage of compressed air and water, an aerohydrostatic water-elevating apparatus situated in a building or buildings more or less remote from said central station, means for passing compressed air separately or simultaneously from said reservoirs to said aerohydrostatic apparatus, means for passing water separately or simultaneously from said reservoirs to said aerohydrostatic apparatus, means for returning air discharged from said aerohydrostatic apparatus back to said central-station compressor, and means for charging separately or simultaneously said reservoirs with air returned from said aerohydrostatic apparatus, substantially as specified and for purposes described.

12. As part of an aerohydrostatic system for a building or buildings, comprising an air-compressor, air and water storage reservoirs 15, 18 and 25, air and water storage reservoirs 58 and 59, installed in a building or buildings more or less remote from said compressor, means of passing air from said compressor to reservoirs 58 and 59, and means for returning air from said reservoirs 58 and 59 back to said compressor, the combination with said compressor, reservoirs, and means for passing air from the compressor to reservoirs 58 and 59 and returning such air to the compressor, of a relay air and water storage tank placed at a higher level in said building or buildings, valve-controlled compressed-air pipe connecting compressed-air service-pipe 56 with said relay-reservoir, valve-controlled water-pipe 74 connected with either or both of the reservoirs 58 or 59 and a valve-controlled return-air pipe connected with the upper part of said relay-tank, and with the return-air service pipe 57, substantially as described.

13. As part of a system of aerohydrostatic water-supply apparatus for a building or buildings, the combination with a compressed-air and water storage reservoir placed in the lower part of such building or buildings and means for supplying air from a central station more or less remote from such reservoir, of duplicate relay air and water storage reservoirs placed at a higher level, valve-controlled pipes connected with the air-spaces in said reservoirs, valve-controlled pipes connected with the water-spaces in said reservoirs and a water-supply pipe extended to floors above and connected with said relay-reservoirs, all being constructed to permit separate operation of either or simultaneous operation of both said relay-reservoirs, substantially as described and for purposes set forth.

14. As part of a system of aerohydrostatic apparatus for a building or group of buildings, the combination of duplicate air and water storage reservoirs placed in the lower part of said building or group of buildings, means for supplying air from a central air-compressing station and with water from a separate source, valve-controlled pipe connections constructed to permit separate operation of either or simultaneous operation of both said reservoirs, duplicate relay air and water storage reservoirs, placed on a higher level than the said lower reservoirs, pipe connections connecting the air and water spaces in said reservoirs and so connected that either of them may operate separately or all may operate together, and a pipe connected with and extended to floors higher than said relay-reservoirs, substantially as and for purposes specified.

15. As part of a system of aerohydrostatic water-supply for a building or a group of buildings, the combination of a compressed-air and water storage reservoir placed in the lower part of such building or buildings, valve-controlled water service-pipe connected with said reservoir, compressed-air-main pipe, valve-controlled air service-pipe connected with said compressed-air-main pipe, and with said reservoir, a valve-controlled pipe connected with said reservoir for supply of water to any part or parts of said building or buildings, a valve-controlled blow-off or flushing pipe connected with the lower part of said reservoir, and a drainage-pipe connected with said blow-off or flushing pipe, substantially as and for purposes described.

16. As part of an aerohydrostatic system of water-supply for a building or buildings, the combination with duplicate compressed-air and water storage reservoirs located in the lower part of such building or buildings, each having an independent valve-controlled water service-pipe and each connected with an independent valve-controlled compressed-air service-pipe and air-discharge pipe, and each having a valve-controlled water-pipe for supply of water to any part or parts of said building or buildings, of a valve-controlled blow-off or flushing pipe connected with each of said reservoirs and with a drainage-pipe, all constructed to permit the separate or simultaneous blowing off or flushing of said reservoirs, substantially as specified.

17. As part of an aerohydrostatic system of water-supply for a building or buildings, the combination with a compressed-air and water reservoir in the lower part of said building or buildings, having an independent water-supply pipe connected with and extending into the interior of such reservoir to a point near the middle of the bottom of the same, of a shield fast to supports attached to the bottom of the reservoir, said shield having a convex surface the middle of which is placed under the discharge-opening of said water-pipe, substantially as described and for purposes set forth.

18. As part of an aerohydrostatic system of water-supply for a building or buildings, the combination with a central-station air-compressing air-storage and water-storage plant, comprising an air-compressor, air and water storage reservoirs, means for separately or simultaneously charging such reservoirs with air from said compressor, independent valve-controlled water-supply pipes, and a valve-controlled water-main pipe extending from said central station to a point near to said building or buildings, of a riser water-supply pipe or pipes placed in such building or buildings and means for connecting said riser-pipe with, or disconnecting it from, said water-main pipe on and from any floor of said building or buildings, substantially as and for purposes set forth.

Signed at Brooklyn, in the county of Kings and State of New York, this 17th day of March, A. D. 1905.

WALLACE P. GROOM.

Witnesses:
CORNELIA R. CUMMINGS,
MARGARET C. TURNER.